(12) United States Patent
Pergolizzi

(10) Patent No.: US 12,544,369 B2
(45) Date of Patent: Feb. 10, 2026

(54) METHODS AND PHARMACEUTICAL COMPOSITIONS TO TREAT DRUG OVERDOSE

(71) Applicant: Joseph V. Pergolizzi, Naples, FL (US)

(72) Inventor: Joseph V. Pergolizzi, Naples, FL (US)

(73) Assignee: Enalare Therapeutics Inc., Princeton, NJ (US)

( * ) Notice: Subject to any disclaimer, the term of this patent is extended or adjusted under 35 U.S.C. 154(b) by 1078 days.

(21) Appl. No.: 17/612,450

(22) PCT Filed: May 20, 2020

(86) PCT No.: PCT/US2020/033866
§ 371 (c)(1),
(2) Date: Nov. 18, 2021

(87) PCT Pub. No.: WO2020/236975
PCT Pub. Date: Nov. 26, 2020

(65) Prior Publication Data
US 2022/0241268 A1 Aug. 4, 2022

Related U.S. Application Data

(60) Provisional application No. 62/898,096, filed on Sep. 10, 2019, provisional application No. 62/872,757, filed on Jul. 11, 2019, provisional application No. 62/851,228, filed on May 22, 2019, provisional application No. 62/851,221, filed on May 22, 2019, provisional application No. 62/851,210, filed on May 22, 2019.

(51) Int. Cl.
*A61K 31/485* (2006.01)
*A61K 45/06* (2006.01)

(52) U.S. Cl.
CPC ............ *A61K 31/485* (2013.01); *A61K 45/06* (2013.01)

(58) Field of Classification Search
CPC .................................................. A61K 31/485
See application file for complete search history.

(56) References Cited

U.S. PATENT DOCUMENTS

| | | | | |
|---|---|---|---|---|
| 4,508,715 A | * | 4/1985 | Booth | A61K 31/44 514/321 |
| 9,162,992 B2 | | 10/2015 | Mannion et al. | |
| 9,351,972 B2 | | 5/2016 | Dax et al. | |
| 2016/0166503 A1 | * | 6/2016 | Crystal | A61M 31/00 604/181 |
| 2018/0169006 A1 | * | 6/2018 | Crystal | A61P 25/04 |
| 2018/0177777 A1 | * | 6/2018 | Ballek | A61K 9/0019 |

FOREIGN PATENT DOCUMENTS

| | | | |
|---|---|---|---|
| WO | 2017/015309 A1 | 1/2017 | |
| WO | WO2017/015309 | * 1/2017 | ......... A61K 31/5415 |
| WO | 2020/041006 A2 | 2/2020 | |

OTHER PUBLICATIONS

Beletsky L., et al., "Prevention of Fatal Opioid Overdose," JAMA, Nov. 2012, 2 Pages.
White J.M., et al., "Mechanisms of Fatal Opioid Overdose," Addiction, 1999, 12 Pages.
Supplementary European Search Report for Application No. 20 80 9694 dated Oct. 18, 2022, 6 pgs.
Dahan, et al., "Averting Opioid-induced Respiratory Depression without Affecting Analgesia," Anesthesiology, Lippincott Williams & Wilking, Apr. 30, 2018, pp. 1027-1037, vol. 128, No. 5.
Reents, et al., "Naloxone and Naltrexone. Application in COPD," Chest, American College of Chest Physicians, Jan. 1, 1998, pp. 217-219, vol. 92, No. 1.
International Search Report of International Application No. PCT/US2020/033866 mailed Aug. 10, 2020, 2 pgs.
Cotten, Joseph F., M.D., Ph.D., "The Latest Pharmacologic Ventilator," The American Society of Anesthesiologists, Inc., Anesthesiology, 2014, pp. 442-444, vol. 121, No. 3.
McLoid, et al., "GAL-021, a new intravenous BKca-channel blocker, is well tolerated and stimulates ventilation in healthy volunteers," British Journal of Anaesthesia, 2014, pp. 875-883, vol. 113, No. 5, Oxford University Press.
Roozekrans, et al., "Two Studies on Reversal of Opiod-induced Respiratory Depression by BK-channel Blocker GAL021 in Human Volunteers," The American Society of Anesthesiologists, Inc., Lippincott Williams & Wilkins, Anesthesiology, 2014, pp. 459-468, vol. 121.
Roozekrans, et al., "Reversal of Opioid-Induced Respiratory Depression by BK-Channel Blocker GAL021: A Pharmacokinetic Modeling Study in Healthy Volunteers," Clinical Pharmacology & Therapeutics, Jun. 2015, pp. 641-649, vol. 97, No. 6.
Soni, et al., "Aminopyridine—A Review," Anaesth Intens Care, May 1982, pp. 120-126, vol. 10.
Van Der Schier, et al., "Opioid-induced respiratory depression: reversal by non-opioid drugs," F1000 Prime Reports, Sep. 4, 2014, 8 pgs.

* cited by examiner

*Primary Examiner* — Paul V Ward
(74) *Attorney, Agent, or Firm* — Lowenstein Sandler LLP

(57) ABSTRACT

Methods and compositions are provided for treating individuals exhibiting opioid withdrawal symptoms with opioid, benzodiazepine and other drugs of abuse by administering an opioid receptor antagonist agent together with a respiratory stimulant to reverse the effects of opioid withdrawal symptoms, including respiratory depression, sedation, and hypotension. Methods and compositions are also provided for treating stimulant overdose with a benzodiazepine and beta-adrenergic blocking agent. Methods and compositions are also provided for treating concurrent stimulant and opioid overdose comprising administering to a patient in need thereof a benzodiazepine and an opioid antagonist. Methods and compositions are also provided for treating individuals exhibiting opioid withdrawal symptoms or prophy tactically treating individuals for opioid withdrawal symptoms from opioid, benzodiazepine and other drugs of abuse by administering an opioid receptor antagonist agent together with a respiratory stimulant to reverse the effects of withdrawal, including respiratory depression, sedation, and hypotension.

8 Claims, 2 Drawing Sheets

METHODS AND PHARMACEUTICAL COMPOSITIONS TO TREAT DRUG OVERDOSE

CROSS-REFERENCE TO RELATED APPLICATIONS

This application claims the benefit of U.S. Provisional Application No. 62/851,210, filed May 22, 2019, titled: Methods and Pharmaceutical Compositions to Treat Drug Overdose; U.S. Provisional Application No. 62/851,221, filed May 22, 2019, titled: Methods and Pharmaceutical Compositions to Treat Stimulant Overdose; U.S. Provisional Application No. 62/851,228, filed May 22, 2019, titled: Methods and Pharmaceutical Compositions to Treat Combined Stimulant and Opioid Overdose; U.S. Provisional Application No. 62/872,757, filed Jul. 11, 2019, titled: Methods and Pharmaceutical Compositions to Treat Drug Overdose; and U.S. Provisional Application No. 62/898,096, filed Sep. 10, 2019, titled: Methods and Pharmaceutical Compositions to Treat Drug Overdose, the entire contents of each of which are hereby incorporated by reference herein.

FIELD OF THE INVENTION

The disclosure relates to compositions and methods for: (1) the treatment of patients who have been subjected to drug overdose, whether by accidental or other means; (2) the treatment of patients who have been subjected to stimulant overdose, whether by accidental or other means; (3) the treatment of patients who have been subjected to combined stimulant and opioid overdose, whether by accidental or other means; (4) the treatment of patients who have opioid withdrawal symptoms, whether by accidental or other means, (5) the prophylactic treatment of patients for opioid withdrawal symptoms, whether by accidental or other means; (6) the treatment of patients who have been subjected to opioids overdose, whether by accidental or other means; (7) the treatment of patients who have been subjected to sedative/hypnotic drugs overdose, whether by accidental or other means; and (8) the treatment of patients who have been subjected to alcohol overdose, whether by accidental or other means.

BACKGROUND OF THE INVENTION

Drug overdose is a major social issue that affects all aspects of society. Drug overdose can be due to prescribed, diverted or illegal substances such as opioids, benzodiazepines and other substances.

Drug overdose of stimulants such as methamphetamine, and stimulants and opioids (e.g. methamphetamine and heroin or oxycodone) is also an issue. Stimulant and stimulant/opioid overdoses can also be due to prescribed, diverted or illegal substances.

Treating opioid dependence reduces the harms suffered by individuals with opioid use disorder and benefits their communities. Opioids may be discontinued in detoxification, which can be described as clinically managed withdrawal. The abrupt discontinuation or even a sudden substantial dose reduction in opioid therapy for a patient on long-term (or even mid-term) opioid treatment or those suffering from opioid use disorder can precipitate distressing and severe opioid withdrawal syndrome and often results in intense symptoms. Treating withdrawal symptoms is an important element of detoxification and successful mitigation of the symptoms and if not appropriately treated, patients may relapse after detoxification.

There remains a need for methods and compositions for the treatment of patients who have been subjected to drug overdose, the treatment of patients who have been subjected to stimulant overdose, the treatment of patients who have been subjected to combined stimulant and opioid overdose, the treatment of patients who have been subjected to combined sedative/hypnotic and opioid overdose, the treatment of patients who have opioid withdrawal symptoms, and the prophylactic treatment of patients for opioid withdrawal symptoms, whether by accidental drug overdose or other means.

SUMMARY OF THE INVENTION

Figure 1:
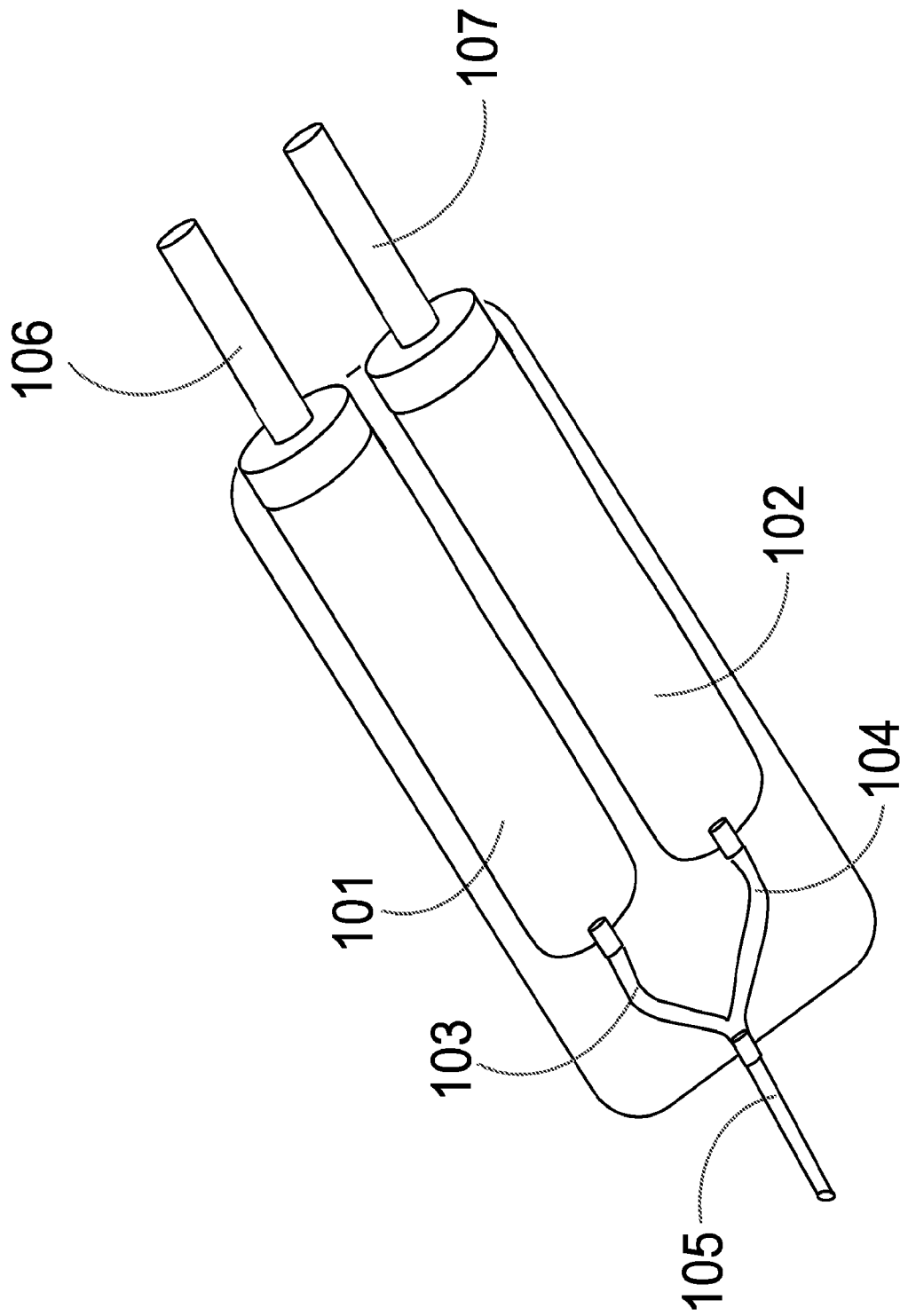
FIG. 1 is an illustration of a delivery device according to an aspect of the invention.

In certain aspects, the disclosure is directed to a method of treating a drug overdose, e.g. Drug-Induced CNS and Respiratory Depression, or poly substance overdose, comprising administering an opioid receptor antagonist and a respiratory stimulant, e.g, GAL-021.

In other aspects, the disclosure is directed to a pharmaceutical composition comprising a combination of an opioid receptor antagonist and a respiratory stimulant, wherein the combination is in an effective amount to treat a drug overdose.

In certain aspects, the disclosure is directed to a method of treating a stimulant overdose comprising administering to a patient in need thereof a benzodiazepine and beta-adrenergic blocking agent.

In other aspects, the disclosure is directed to a pharmaceutical composition comprising a combination of a benzodiazepine and beta-adrenergic blocking agent, wherein the combination is in an effective amount to treat a stimulant overdose.

In certain aspects, the disclosure is directed to a method of treating a concurrent stimulant and opioid overdose comprising administering to a patient in need thereof a benzodiazepine and an opioid antagonist.

In other aspects, the disclosure is directed to a pharmaceutical composition comprising a combination of a benzodiazepine and an opioid antagonist, wherein the combination is in an effective amount to treat a combined stimulant and opioid overdose.

In certain aspects, the disclosure is directed to a method of treating opioid withdrawal syndrome comprising administering an opioid receptor antagonist and a respiratory stimulant to a patient in need thereof.

In other aspects, the disclosure is directed to a pharmaceutical composition comprising a combination of an opioid receptor antagonist and a respiratory stimulant, wherein the combination is in an effective amount to treat opioid withdrawal syndrome to a patient in need thereof.

In certain aspects, the disclosure is directed to a method for prophylactically treating opioid withdrawal symptoms comprising administering an opioid receptor antagonist and a respiratory stimulant to a patient in need thereof.

In other aspects, the disclosure is directed to a pharmaceutical composition comprising a combination of an opioid receptor antagonist and a respiratory stimulant, wherein the combination is in an effective amount to prophylactically treat opioid withdrawal symptoms to a patient in need thereof.

DETAILED DESCRIPTION

In one aspect, the disclosure is directed to a method of treating a drug overdose, e.g. Drug-Induced CNS and Respiratory Depression, comprising administering an opioid receptor antagonist and a respiratory stimulant, e.g, GAL-021.

In another aspect, the disclosure is directed to a pharmaceutical composition comprising a combination of an opioid receptor antagonist and a respiratory stimulant, wherein the combination is in an effective amount to treat a patient in need thereof for a drug overdose.

In a particular aspect, the drug overdose can be accompanied by respiratory depression, sedation, apnea, hypotension, adverse central nervous system effects, adverse cardiac effects or a combination thereof.

In a particular aspect, the antagonist and the stimulant can be administered simultaneously or sequentially.

In a particular aspect, the antagonist and the stimulant can be administered by the same route of administration.

In a particular aspect, the antagonist and the stimulant can be administered by different routes of administration.

In a particular aspect, the antagonist and the stimulant can be administered in the same pharmaceutical composition.

In a particular aspect, the antagonist and the stimulant can be administered in different pharmaceutical compositions.

In a particular aspect, the opioid receptor antagonist can be selected from the group consisting of naltrexone, methylnaltrexone, naloxone, nalmefene, and a pharmaceutically-acceptable salt thereof.

In a particular aspect, the respiratory stimulant can be selected from the group consisting of Doxapram, Almitrine, GAL-021, and a pharmaceutically-acceptable salt thereof.

In a particular aspect, the combination of antagonist and stimulant can be provided at a therapeutic dose which is sufficient to restore or improve the respiratory rhythm of the overdosed patient.

In a particular aspect, the combination of antagonist and stimulant can be provided at a therapeutic dose which does not induce hyperventilation or substantial hyperventilation in the overdosed patient.

In a particular aspect, the antagonist can be provided at a sub-therapeutic dose or super-therapeutic dose if administered without the stimulant.

In a particular aspect, antagonist is provided at a therapeutic dose if administered without the stimulant.

In a particular aspect, the stimulant is provided at a sub-therapeutic or super-therapeutic dose if administered without the antagonist.

In a particular aspect, the stimulant is provided at a therapeutic dose if administered without the antagonist.

In a particular aspect, the drug overdose is caused by one or more of an opioid agonist, benzodiazepine, barbiturate, gabapentinoid, alcohol, or propofol.

In a particular aspect, the route for both agents is selected from oral, intravenous, nasal, inhalational, topical, buccal, rectal, pleural, peritoneal, vaginal, intramuscular, subcutaneous, transdermal, epidural, intratrachael, otic, intraocular, or intrathecal route.

In a particular aspect, the route for each agent is independently selected from oral, intravenous, nasal, intranasal, inhalational, topical, buccal, rectal, pleural, peritoneal, vaginal, intramuscular, subcutaneous, transdermal, epidural, intratrachael, otic, intraocular, or intrathecal route.

In a particular aspect, the antagonist and stimulant is administered through an autoinjector containing a fixed dose combination of the agents.

In a particular aspect, the agents are contained in a glass or plastic container.

In a particular aspect, the composition is pre-mixed.

In a particular aspect, the agents are contained in a bifurcated applicator.

In a particular aspect, the agents are contained in an autoinjector that is included in an emergency kit.

In a particular aspect, the emergency kit is wall mounted.

In a particular aspect, one or both agents are lyophilized.

In a particular aspect, a GABAa antagonist such as flumazenil is administered.

In other aspects the respiratory stimulant can be a compound that acts on a steroid receptor mediated mechanism such as progesterone, a carotid body stimulant such as almitrine bismesylate, a carbonic anhydrase inhibitor such as acetazolamide, xanthines such as caffeine, theophylline, reflex stimulants such as ammonia and alcohol vapors, modafinil, and prethcamide.

In one aspect, the disclosure is directed to a method of treating stimulant overdose comprising administering to a patient in need thereof a benzodiazepine and beta-adrenergic blocking agent.

In another aspect, the disclosure is directed to a pharmaceutical composition comprising a combination of a benzodiazepine and a beta-adrenergic blocking agent, wherein the combination is in an effective amount to treat a patient in need thereof for a stimulant overdose.

In a particular aspect, the drug overdose can be accompanied by fever, chest pain, rapid breathing labored breathing increased heart rate, increased blood pressure, sweating, convulsions, tremors, rise in body temperature, cardiovascular collapse, anxiety, agitation, combative behavior or a combination thereof.

In a particular aspect, the stimulant overdose is accompanied by increased heart rate and combative behavior.

In a particular aspect, the benzodiazepine and the beta-adrenergic blocking agent can be administered simultaneously or sequentially.

In a particular aspect, the benzodiazepine and the beta-adrenergic blocking agent can be administered by the same route of administration.

In a particular aspect, the benzodiazepine and the beta-adrenergic blocking agent can be administered by different routes of administration.

In a particular aspect, the benzodiazepine and the beta-adrenergic blocking agent can be administered in the same pharmaceutical composition.

In a particular aspect, the benzodiazepine and the beta-adrenergic blocking agent can be administered in different pharmaceutical compositions.

In a particular aspect the benzodiazepine is selected from the group consisting of alprazolam, brotizolam, chlordiazepoxide, clobazam, clonazepam, clorazepam, demoxazepam, diazepam, flumazenil, flurazepam, halazepam, midazolam, nordazepam, medazepam, nitrazepam, oxazepam, lorazepam, prazepam, quazepam, triazolam, temazepam, loprazolam, and pharmaceutically-acceptable salts thereof.

In a particular aspect, the beta-adrenergic blocking agent is selected from the group consisting of propranolol, atenolol, carteolol, carvedilol, labetalol, nadolol, oxprenolol, penbutolol, pindolol, sotalol, timolol, acebutolol, betaxolol, bisoprolol, celiprolol, esmolol, metoprolol, nebivolol and pharmaceutically-acceptable salts thereof.

In a particular aspect, the combination of the benzodiazepine and the beta-adrenergic blocking agent is provided at a therapeutic dose which is sufficient to decrease agitation and heart rate.

In a particular aspect, the combination of the benzodiazepine and the beta-adrenergic blocking agent is provided at a therapeutic dose which does not induce hypotension and respiratory depression.

In a particular aspect, the benzodiazepine is provided at a sub-therapeutic dose or super-therapeutic dose if administered without the beta-adrenergic blocker.

In a particular aspect, the benzodiazepine is provided at a therapeutic dose if administered without the beta-adrenergic blocker.

In a particular aspect, the beta-adrenergic blocker is provided at a sub-therapeutic or super-therapeutic dose if administered without the benzodiazepine.

In a particular aspect, the beta-adrenergic blocker is provided at a therapeutic dose if administered without the benzodiazepine.

In a particular aspect, the stimulant overdose is caused by one or more of methamphetamine, 3,4-methylenedioxymethamphetamine, methylphenidate, amphetamine mixed salts, lisdexamphetamine, caffeine, ephedrine, methylenedioxypyrovalerone, mephedrone, nicotine, phenylpropanolamine, propylhexedrine, pseudoephedrine or cocaine.

In a particular aspect, the route for both agents is selected from oral, intravenous, nasal, inhalational, topical, buccal, rectal, pleural, peritoneal, vaginal, intramuscular, subcutaneous, transdermal, epidural, intratrachael, otic, intraocular, or intrathecal route.

In a particular aspect, the route for each agent is independently selected from oral, intravenous, nasal, inhalational, topical, buccal, rectal, pleural, peritoneal, vaginal, intramuscular, subcutaneous, transdermal, epidural, intratrachael, otic, intraocular, or intrathecal route.

In a particular aspect, the benzodiazepine and the beta-adrenergic blocking agent is administered through an autoinjector containing a fixed dose combination of the agents.

In a particular aspect, the agents are contained in a glass or plastic container.

In a particular aspect, the composition is pre-mixed.

In a particular aspect, the agents are contained in a bifurcated applicator.

In a particular aspect, the agents are contained in an autoinjector that is included in an emergency kit.

In a particular aspect, the emergency kit is wall mounted.

In a particular aspect, one or both agents are lyophilized.

In a particular aspect, the methods or compositions thereof further include the administration of an antipsychotic such as haloperidol, olanzapine or a combination thereof.

In a particular aspect, the methods or compositions thereof further include the administration of an anti-histamine such as diphenhydramine.

In one aspect, the composition further comprises at least one pharmaceutically acceptable carrier.

In one aspect, the weight ratio of the benzodiazepine and the opioid antagonist can be from about 1:9 to about 9:1, from about 1:7 to about 7:1, from about 1:5 to about 5:1, or from about 1:3 to about 3:1.

In one aspect, the weight ratio of the antagonist to the respiratory stimulant can be from about 1:9 to about 9:1, from about 1:7 to about 7:1, from about 1:5 to about 5:1, or from about 1:3 to about 3:1.

In alternative aspects, the respiratory stimulant of formula I is used as the sole active agent without an antagonist in methods and pharmaceutical compositions for the treatment of drug overdose such as opioid overdose as disclosed herein.

In one aspect, the weight ratio of the benzodiazepine and the beta-adrenergic blocking agent can be from about 1:9 to about 9:1, from about 1:7 to about 7:1, from about 1:5 to about 5:1, or from about 1:3 to about 3:1.

In one aspect, the compositions are formulated using one or more pharmaceutically acceptable excipients or carriers. Pharmaceutically acceptable carriers, which are useful, include, but are not limited to, glycerol, water, saline, ethanol and other pharmaceutically acceptable salt solutions such as phosphates and salts of organic acids. The carrier may be a solvent or dispersion medium containing, for example, water, ethanol, polyol (for example, glycerol, propylene glycol, and liquid polyethylene glycol, and the like), suitable mixtures thereof, and vegetable oils. The proper fluidity may be maintained, for example, by the use of a coating such as lecithin, by the maintenance of the required particle size in the case of dispersion and by the use of surfactants. Prevention of the action of microorganisms may be achieved by various antibacterial and antifungal agents, for example, parabens, chlorobutanol, phenol, ascorbic acid, thimerosal, and the like. In certain aspects, there can be the inclusion of isotonic agents, for example, sugars, sodium chloride, or polyalcohols such as mannitol and sorbitol, in the composition.

Formulations may be employed in admixtures with conventional excipients, i.e., pharmaceutically acceptable organic or inorganic carrier substances suitable for oral, parenteral, nasal, inhalational, intravenous, subcutaneous, transdermal enteral, or any other suitable mode of administration. The pharmaceutical preparations may be sterilized and if desired mixed with auxiliary agents, e.g., lubricants, preservatives, stabilizers, wetting agents, emulsifiers, salts for influencing osmotic pressure buffers, coloring, flavoring and/or aromatic substances and the like.

In some aspects of a nasal formulation, the pharmaceutical composition of the benzodiazepine and the beta-adrenergic blocking agent includes one or more excipients selected from water, NaCl, benzalkonium chloride, sodium edetate, disodium edetate, and hydrochloric acid.

In some aspects of a nasal formulation, the pharmaceutical composition of the antagonist and the respiratory stimulant includes one or more excipients selected from water, NaCl, benzalkonium chloride, sodium edetate, disodium edetate, and hydrochloric acid.

In some aspects of a nasal formulation, the pharmaceutical composition further comprises water, NaCl, benzalkonium chloride, disodium edetate, and hydrochloric acid.

In some aspects of a nasal formulation, the pharmaceutical composition further comprises: an isotonicity agent; a preservative; a stabilizing agent; an amount of an acid sufficient to achieve a pH or 3.5-5.5; and an amount of water.

In some aspects of a nasal formulation, the pharmaceutical composition comprises: between about 0.2 mg and about 1.2 mg of an isotonicity agent; between about 0.005 mg and about 0.015 mg of a preservative; between about 0.1 mg and about 0.5 mg of a stabilizing agent; an amount of an acid sufficient to achieve a pH or 3.5-5.5; and an amount of water.

In some aspects of a nasal formulation, the isotonicity agent is NaCl; the preservative is benzalkonium chloride; the stabilizing agent is disodium edetate; and the acid is hydrochloric acid.

In some aspects of a nasal formulation, said pharmaceutical composition comprises: about 0.74 mg NaCl; about 0.01 mg benzalkonium chloride; about 0.2 mg disodium edetate; an amount of hydrochloric acid sufficient to achieve a pH or 3.5-5.5; and an amount of water.

In certain aspects the benzodiazepine and the opioid antagonist have an additive pharmacodynamic effect or a synergistic pharmacodynamic effect when used in the methods disclosed herein.

In certain aspects the benzodiazepine and the beta-adrenergic blocking agent have an additive pharmacodynamic effect or a synergistic pharmacodynamic effect when used in the methods disclosed herein.

In certain aspects the antagonist and the respiratory stimulant have an additive pharmacodynamic effect or a synergistic pharmacodynamic effect when used in the methods disclosed herein.

The pharmacologically acceptable salts of any of the active agents utilized in the methods and compositions of the disclosure can be, for example, an inorganic salt such as a hydrochloride, a sulfate, a phosphate or a hydrobromide; or an organic salt such as an oxalate, a malonate, a citrate, a fumarate, a lactate, a malate, a succinate, a tartrate, an acetate, a trifluoroacetate, a maleate, a gluconate, a benzoate, a salicylate, a xinafoate, a pamoate, an ascorbate, an adipate, a methanesulfonate, a p-toluenesulfonate or a cinnamate. These salts may be present in the form of a hydrate, a solvate or a crystalline polymorph.

In one aspect, the disclosure is directed to a method of treating a concurrent stimulant and opioid overdose comprising administering to a patient in need thereof a benzodiazepine and an opioid antagonist.

In another aspect, the disclosure is directed to a pharmaceutical composition comprising a combination of a benzodiazepine and an opioid antagonist, wherein the combination is in an effective amount to treat a patient in need thereof for a concurrent stimulant and opioid overdose.

In a particular aspect, the concurrent stimulant and opioid overdose is accompanied by respiratory depression, sedation, hypotension, adverse central nervous system effects, adverse cardiac effects, fever, chest pain, rapid breathing, labored breathing increased heart rate, increased blood pressure, sweating, convulsions, tremors, rise in body temperature, cardiovascular collapse, anxiety, agitation, combative behavior or a combination thereof.

In a particular aspect, the concurrent stimulant and opioid overdose is accompanied by one or more of increased heart rate, respiratory depression and combative behavior.

In a particular aspect, the benzodiazepine and the opioid antagonist can be administered simultaneously or sequentially.

In a particular aspect, the benzodiazepine and the opioid antagonist can be administered by the same route of administration.

In a particular aspect, the benzodiazepine and the opioid antagonist can be administered by different routes of administration.

In a particular aspect, the benzodiazepine and the opioid antagonist can be administered in the same pharmaceutical composition.

In a particular aspect, the benzodiazepine and the beta-adrenergic blocking agent can be administered in different pharmaceutical compositions.

In a particular aspect the benzodiazepine is selected from the group consisting of alprazolam, brotizolam, chlordiazepoxide, clobazam, clonazepam, clorazepam, demoxazepam, diazepam, flumazenil, flurazepam, halazepam, midazolam, nordazepam, medazepam, nitrazepam, oxazepam, lorazepam, prazepam, quazepam, triazolam, temazepam, loprazolam, and pharmaceutically-acceptable salts thereof.

In a particular aspect, the opioid antagonist is selected from the group consisting of naltrexone, naloxone, nalmefene, and a pharmaceutically-acceptable salt thereof.

In a particular aspect, the combination of the benzodiazepine and the opioid antagonist is provided at a therapeutic dose which is sufficient to decrease agitation.

In a particular aspect, the combination of the benzodiazepine and the opioid antagonist is provided at a therapeutic dose which is sufficient to restore or improve the respiratory rhythm of the overdosed patient.

In a particular aspect, the benzodiazepine is provided at a sub-therapeutic dose or super-therapeutic dose if administered without the opioid antagonist.

In a particular aspect, the benzodiazepine is provided at a therapeutic dose if administered without the opioid antagonist.

In a particular aspect, the opioid antagonist is provided at a sub-therapeutic or super-therapeutic dose if administered without the benzodiazepine.

In a particular aspect, the opioid antagonist is provided at a therapeutic dose if administered without the benzodiazepine.

In a particular aspect, the stimulant overdose is caused by one or more of methamphetamine, 3,4-methylenedioxymethamphetamine, methylphenidate, amphetamine mixed salts, lisdexamphetamine, caffeine, ephedrine, methylenedioxypyrovalerone, mephedrone, nicotine, phenylpropanolamine, propylhexedrine, pseudoephedrine or cocaine and the opioid overdose is caused by one or more of heroin, oxycodone, fentanyl, codeine, oxymorphone, morphine or hydrocodone.

In a particular aspect, the route for both agents is selected from oral, intravenous, nasal, inhalational, topical, buccal, rectal, pleural, peritoneal, vaginal, intramuscular, subcutaneous, transdermal, epidural, intratrachael, otic, intraocular, or intrathecal route.

In a particular aspect, the route for each agent is independently selected from oral, intravenous, nasal, inhalational, topical, buccal, rectal, pleural, peritoneal, vaginal, intramuscular, subcutaneous, transdermal, epidural, intratrachael, otic, intraocular, or intrathecal route.

In a particular aspect, the benzodiazepine and the opioid antagonist is administered through an autoinjector containing a fixed dose combination of the agents.

In a particular aspect, the agents are contained in a glass or plastic container.

In a particular aspect, the composition is pre-mixed.

In a particular aspect, the agents are contained in a bifurcated applicator.

In a particular aspect, the agents are contained in an autoinjector that is included in an emergency kit.

In a particular aspect, the emergency kit is wall mounted.

In a particular aspect, one or both agents are lyophilized.

In a particular aspect, the methods or compositions thereof further include the administration of an antipsychotic such as haloperidol, olanzapine or a combination thereof.

In a particular aspect, the methods or compositions thereof further include the administration of an anti-histamine such as diphenhydramine.

In a particular aspect, the methods or compositions thereof further include the administration of a beta-adrenergic blocking agent such as propranolol, atenolol, carteolol, carvedilol, labetalol, nadolol, oxprenolol, penbutolol, pindolol, sotalol, timolol, acebutolol, betaxolol, bisoprolol, celiprolol, esmolol, metoprolol, nebivolol and pharmaceutically-acceptable salts thereof.

In a particular aspect, the methods or compositions thereof further include the administration of a respiratory stimulant.

The respiratory stimulant can be a e.g., a compound that acts on a steroid receptor mediated mechanism such as progesterone, a carotid body stimulant such as almitrine bismesylate, a carbonic anhydrase inhibitor such as acetazolamide, xanthines such as caffeine, theophylline, reflex stimulants such as ammonia and alcohol vapors, modafinil, and prethcamide.

In one aspect, the disclosure is directed to a method of treating opioid withdrawal symptoms or prophylactically treating opioid withdrawal symptoms comprising administering an opioid receptor antagonist and a respiratory stimulant to a patient in need thereof.

In another aspect, the disclosure is directed to a pharmaceutical composition comprising a combination of an opioid receptor antagonist and a respiratory stimulant, wherein the combination is in an effective amount to treat or prophylactically treat opioid withdrawal symptoms in a patient in need thereof.

In a particular aspect, drug overdose or opioid withdrawal symptoms is due to polypharmacy.

In a particular aspect, the drug overdose can be accompanied by respiratory depression, sedation, apnea, hypotension, adverse central nervous system effects, adverse cardiac effects or a combination thereof.

In a particular aspect, the antagonist and the stimulant can be administered simultaneously or sequentially.

In a particular aspect, the antagonist and the stimulant can be administered by the same route of administration.

In a particular aspect, the antagonist and the stimulant can be administered by different routes of administration.

In a particular aspect, the antagonist and the stimulant can be administered in the same pharmaceutical composition.

In a particular aspect, the antagonist and the stimulant can be administered in different pharmaceutical compositions.

In a particular aspect, the opioid receptor antagonist can be selected from the group consisting of naltrexone, methylnaltrexone, naloxone, nalmefene, and a pharmaceutically-acceptable salt thereof.

In a particular aspect, the respiratory stimulant can be selected from the group consisting of Doxapram, Almitrine, GAL-021, and a pharmaceutically-acceptable salt thereof.

In a particular aspect, the combination of antagonist and stimulant can be provided at a therapeutic dose which is sufficient to restore or improve the respiratory rhythm of the overdosed patient.

In a particular aspect, the combination of antagonist and stimulant can be provided at a therapeutic dose which does not induce hyperventilation or substantial hyperventilation in the overdosed patient.

In a particular aspect, the antagonist can be provided at a sub-therapeutic dose or super-therapeutic dose if administered without the stimulant.

In a particular aspect, antagonist is provided at a therapeutic dose if administered without the stimulant.

In a particular aspect, the stimulant is provided at a sub-therapeutic or super-therapeutic dose if administered without the antagonist.

In a particular aspect, the stimulant is provided at a therapeutic dose if administered without the antagonist.

In a particular aspect, the drug overdose is caused by one or more of an opioid agonist, benzodiazepine, barbiturate or gabapentinoid. A drug overdose caused by multiple drugs can be referred to as overdose due to polypharmacy.

In a particular aspect, the routes for administration for both agents is selected from oral, intravenous, nasal, inhalational, topical, buccal, rectal, pleural, peritoneal, vaginal, transvaginal, intramuscular, subcutaneous, transdermal, epidural, intratrachael, otic, intraocular, sublingual, optic, implantable, intrathecal or parenteral. Parenteral includes but is not limited to intravenous, intraarterial, intramuscular, subcutaneous, epidural, intracutaneous, implantable, intraarticular or intrathecal injection.

In a particular aspect, the routes for administration for each agent is independently selected from oral, intravenous, nasal, inhalational, topical, buccal, rectal, pleural, peritoneal, vaginal, transvaginal, intramuscular, subcutaneous, transdermal, epidural, intratrachael, otic, intraocular, sublingual, optic, implantable, intrathecal or parenteral. Parenteral includes but is not limited to intravenous, intraarterial, intramuscular, subcutaneous, epidural, intracutaneous, implantable, intraarticular or intrathecal injection.

In a particular aspect, the delivery systems include, but are not limited to: oral solid dosage forms, (e.g., tablets or capsules), controlled release oral solid dosage forms, oral liquids (e.g., solutions, suspensions, emulsions, or dispersions), oral or sublingual film strips, oral or sublingual fast-dissolving tablets, topical creams, ointments, gels or lotions, transdermal systems, parenteral solutions or suspensions, single shot parenteral (e.g., epidural) formulations and parenteral pumps.

In certain aspects, the delivery system can be in implantable depot formulation that provides an effective amount of the disclosed combination over an extended period in order to treat opioid overdose, opioid withdrawal symptoms or to prophylactically treat an opioid overdose or withdrawal symptoms. The depot formulation provide a release of the combination of active agents for a time period, e.g., from about 1 day to about 6 months or longer. In certain aspects, the time period is about 3 days, about 7 days, about 30 days or about 90 days.

The depot formulations can comprise the combination of active agents together with controlled release excipients (e.g., controlled release polymers) in the form of, e.g., an implantable monolith or as controlled release particles (e.g., microparticles). The formulations can be injected or implantable (e.g., subcutaneously) with an incision. The controlled release excipients can be, e.g. polylactic-glycolic acid, ethylene vinyl acetate copolymer, silicone, hydrogels such as crosslinked poly(vinyl alcohol) and poly(hydroxyethylmethacrylate), acyl substituted cellulose acetates and alkyl derivatives thereof, hydrolyzed alkylene-vinyl acetate copolymers, unplasticized polyvinyl chloride, crosslinked homo- and copolymers of polyvinyl acetate, crosslinked polyesters of acrylic acid and/or methacrylic acid, polyvinyl alkyl ethers, polyvinyl fluoride, polycarbonate, polyurethane, polyamide, polysulphones, styrene acrylonitrile copolymers, crosslinked poly(ethylene oxide), poly(alkylenes), poly(vinyl imidazole), poly(esters), poly(ethylene terephthalate), polyphosphazenes, and chlorosulphonatedpolyolefines, and combinations thereof.

In oral films, the dosage form can include, e.g., soluble excipients such as lactose, mannitol, dextrose, sucrose or mixtures thereof as well as granulating and/or disintegrating agents such as starch, binding agents such as povidone, polyethylene oxide or hydroxypropylmethyl cellulose and lubricating agents such as magnesium stearate.

In a particular aspect, the antagonist and stimulant is administered through an autoinjector containing a fixed dose combination of the agents.

In a particular aspect, the agents are contained in a glass or plastic container.

In a particular aspect, the composition is pre-mixed.

In a particular aspect, the agents are contained in a bifurcated applicator.

In a particular aspect, the respiratory stimulant and the opioid receptor antagonist are contained in a pre-filled syringe in separate compartments. The syringe can be an autoinjector or can be a syringe for standard parenteral administration. The compartments can be arranged such that the pre-filled syringe device allows for the sequential administration of the two actives by one or multiple actuations. In other embodiments, the pre-filled syringe allows for the separate active agents to be mixed prior to simultaneous administration by one or multiple actuations.

Referring to FIG. 1, the separate compartments (101, 102) can be configured adjacent to each other such that each compartment is in fluid connection with a respective exit port (103, 104) that channels into a delivery syringe (105). Each plunger (106, 107) can be activated simultaneously or sequentially to provide simultaneous or sequential delivery, respectively. A dual plunger delivery device can be modified from, e.g., EP0212798, the entire contents of which are hereby incorporated by reference herein.

Figure 2:
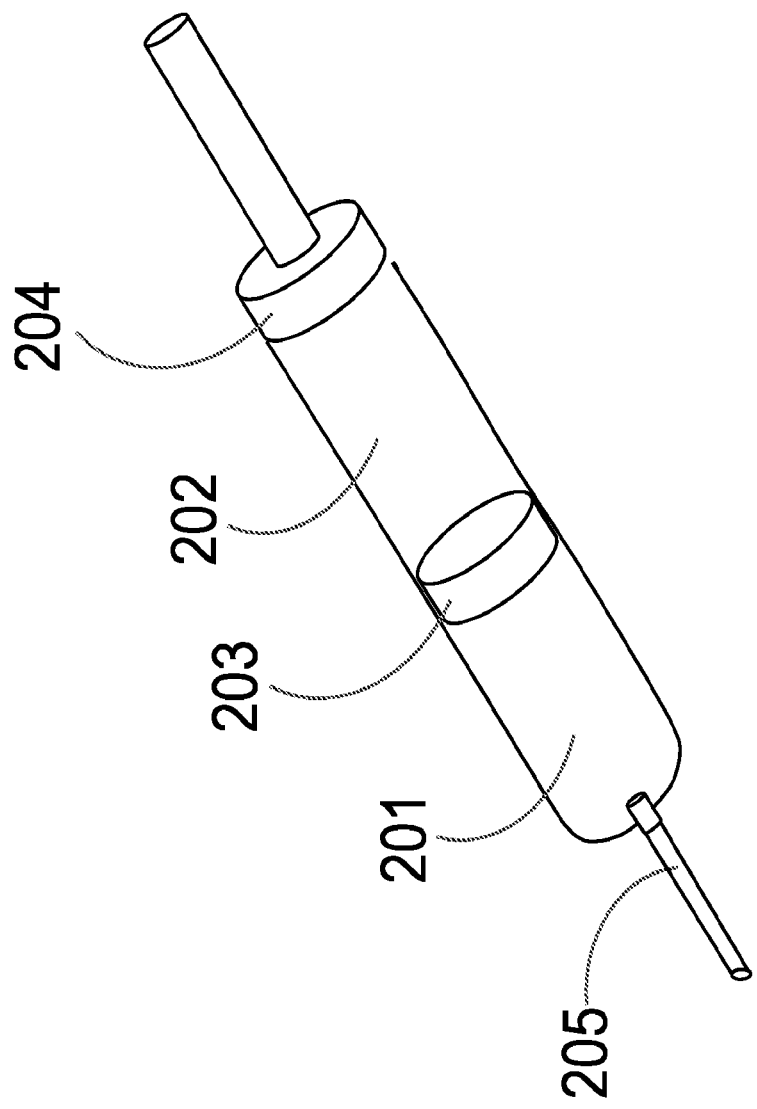
FIG. 2 is an illustration of a delivery device according to an aspect of the invention

Referring to FIG. 2, one compartment can be at a distal end of the device (201) and another compartment can be at a proximal end of the device (202). There can be a stopper (203) between the fluid compartments (101, 102) that separates the fluid components contained therein and can be actuated to allow the compartments (101,102) to be in fluid connection with each other. In one administration embodiment, the stopper (203) can be opened and the active agent of the proximal compartment (202) can be pushed by a plunger (204) into the distal compartment (201) for mixing of the active agents prior to administration through the delivery syringe (205). The two agents can then be simultaneously administered. In another administration embodiment, the plunger (204) can force the administration of the distal compartment (201), while at the same time advancing the contents of the second compartment (202) from the proximal end to the distal end for a subsequent and separate administration, such that the two active are administered sequentially without pre-mixing. A single plunger delivery device can be modified from, e.g., U.S. Pat. Nos. 6,866,653 and 6,997,910, the entire contents of which are hereby incorporated by reference herein.

In a particular aspect, the agents are contained in an autoinjector that is included in an emergency kit.

In a particular aspect, the emergency kit is wall mounted.

In a particular aspect, one or both agents are lyophilized.

In a particular aspect, a GABAa antagonist such as flumazenil is administered.

In other aspects the respiratory stimulant can be a compound that acts on a steroid receptor mediated mechanism such as progesterone, a carotid body stimulant such as almitrinebismesylate, a carbonic anhydrase inhibitor such as acetazolamide, xanthines such as caffeine, theophylline, reflex stimulants such as ammonia and alcohol vapors, modafinil, and prethcamide.

The respiratory stimulant can include at least one compound of formula (I):

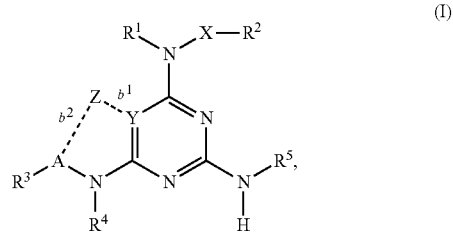

(I)

wherein:

$R^1$ and $R^2$ are independently H, alkyl, substituted alkyl, cycloalkyl, substituted cycloalkyl, alkenyl, substituted alkenyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl or substituted heteroaryl; or $R^1$ and $R^2$ combine as to form a biradical selected from the group consisting of 3-hydroxy-pentane-1,5-diyl, 6-hydroxy-cycloheptane-1,4-diyl, propane-1,3-diyl, butane-1,4-diyl and pentane-1,5-diyl;

$R^3$ is H, alkyl, substituted alkyl, cycloalkyl, substituted cycloalkyl, alkenyl, substituted alkenyl, —$NR^1R^2$, —C(O)ORI, acyl, or aryl;

$R^4$ is H, alkyl, or substituted alkyl;

$R^5$ is H, alkyl, substituted alkyl, cycloalkyl, substituted cycloalkyl, alkenyl, substituted alkenyl, —OR, —$NR^1R^2$, —C(O)ORI, acyl, aryl, substituted aryl, heteroaryl, substituted heteroaryl, heterocyclic, or substituted heterocyclic; or $R^3$ and $R^5$ combine as to form a biradical selected from the group consisting of 3,6,9-trioxa-undecane-1,11-diyl and 3,6-dioxa-octane-1,8-diyl;

$R^6$ is H, alkyl, substituted alkyl or alkenyl;

X is a bond, O or NR; and,

Y is N, $CR^6$ or C; wherein:

if Y is N or $CR^6$, then bond $b^1$ is nil and: (i) Z is H, bond $b^2$ is a single bond, and A is CH; or, (ii) Z is nil, bond $b^2$ is nil, and A is a single bond; and, if Y is C, then bond $b^1$ is a single bond, and: (i) Z is $CH_2$, bond $b^2$ is a single bond, and A is CH; or, (ii) Z is CH, bond $b^2$ is a double bond, and A is C;

or a salt thereof.

In one aspect, $R^3$ is H, alkyl, substituted alkyl, cycloalkyl, substituted cycloalkyl, alkenyl, or substituted alkenyl. In another aspect, $R^5$ is H, alkyl, substituted alkyl, cycloalkyl, substituted cycloalkyl, alkenyl, substituted alkenyl, or acyl.

In one aspect, the at least one compound of formula (I) is selected from the group consisting of: (i) Y is N, bond $b^1$ is nil, Z is H, bond $b^2$ is a single bond, A is CH, and the at least one compound is a compound of formula (II-a) or a salt thereof:

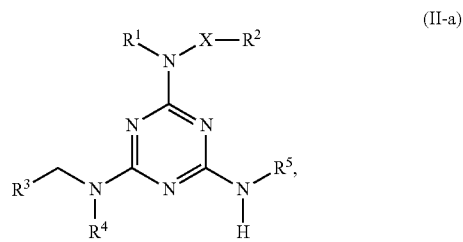

(II-a)

and (ii) Y is N, bond $b^1$ is nil, Z is nil, bond $b^2$ is nil, and A is a bond, and the compound of the invention is a 1,3,5-triazine of formula (II-b) or a salt thereof:

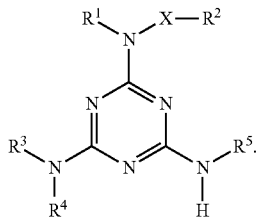

(II-b)

In one aspect, the at least one compound of formula (I) is selected from the group consisting of: (i) Y is CR, bond b is nil, Z is H, bond $b^2$ is a single bond, A is CH, and the at least one compound is a compound of formula (III-a) or a salt thereof:

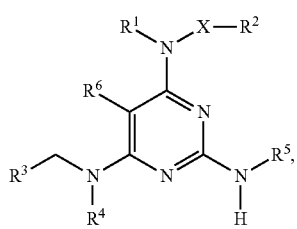

(III-a)

and (ii) Y is $CR^6$, bond $b^1$ is nil, Z is nil, bond $b^2$ is nil, and A is a bond, and the compound of the invention is a pyrimidine of formula (III-b) or a salt thereof:

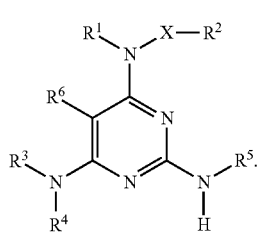

(III-b)

In one aspect, Y is C, bond $b^1$ is a single bond, Z is $CH_2$, bond $b^2$ is a single bond, A is CH, and said at least one compound is a compound of formula (IV) or a salt thereof:

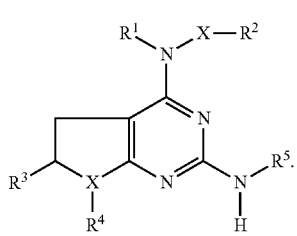

(IV)

In one aspect, Y is C, bond $b^1$ is a single bond, Z is CH, bond $b^2$ is a double bond, A is C, and said at least one compound is a compound of formula (V) or a salt thereof:

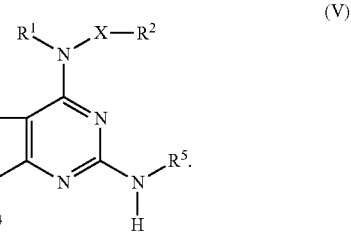

(V)

In one aspect, the at least one compound is selected from the group consisting of: N-(4,6-Bis-methylamino-[1,3,5]triazin-2-yl)-N,O-dimethyl-hydroxylamine (XX), N-(4,6-Bis-ethylamino-[1,3,5]triazin-2-yl)-N,O-dimethyl-hydroxylamine (XXII), N-(4-Cyclopropylmethylamino)-N-(6-n-propylamino) [1,3,5]triazin-2-yl)-N,O-dimethyl-hydroxylamine (XXV), N-(4-Ethylamino)-N-(6-n-propylamino)-[1,3,5]triazin-2-yl)-N,O-dimethyl-hydroxylamine (XXVII), N-(Bis-4,6-(2-methylpropylamino)) [1,3,5]triazin-2-yl)-N,O-dimethyl-hydroxylamine (XXIX), N-(Bis-4,6-(2,2-dimethylpropylamino)) [1,3,5]triazin-2-yl)-O,N-dimethyl-hydroxylamine (XXXI), 4,6-Bis-N-cyclopropylamino-[1,3,5]triazin-2-yl)-N,O-dimethyl-hydroxylamine hydrochloride (XXXIII), N-(4,6-Bis-n-propylamino-[1,3,5]triazin-2-yl)-O,N-dimethyl-hydroxylamine (XXXV), N-(4-(Methoxy (methyl)amino)-6-(propylamino)-1,3,5-triazin-2-yl)propionamide (XL), N-(4,6-Bis-propylamino-[1,3,5]triazin-2-yl)-O-methyl-hydroxylamine (XLI), O-Allyl-N-(4,6-bis-propylamino-[1,3,5]triazin-2-yl)-hydroxylamine (XLIII), N-(4,6-Bis-propylamino-[1,3,5]triazin-2-yl)-hydroxylamine (XLV), 6-(Methoxy(methyl)amino)-N2-propyl-1,3,5-triazine-2,4-diamine (XLVII), N-(4,6-Bis-propylamino-[1,3,5]triazin-2-yl)-N-methyl-hydroxylamine (XLVIII), O-Benzyl-N-(4,6-bis-propylamino-[1,3,5]triazin-2-yl)-N-methyl-hydroxylamine (LIII), N-(4,6-Bis-propylamino-[1,3,5]triazin-2-yl)-N-isopropyl-hydroxylamine (LV), 6-[1,2]Oxazinan-2-yl-N,N'-dipropyl-[1,3,5]triazine-2,4-diamine (LVII), N-(4,6-Bis-propylamino-[1,3,5]triazin-2-yl)-O-isopropyl-N-methyl-hydroxylamine (LXIV), O-Benzyl-N-(4,6-bis-propylamino-[1,3,5]triazin-2-yl)-N-ethyl-hydroxylamine (LXVIII), N-(4,6-Bis-propylamino-[1,3,5]triazin-2-yl)-O-isopropyl-hydroxylamine (LXX), 6-((Benzyloxy)(isopropyl)amino)-$N^2,N^4$-dipropyl-1,3,5-triazine-2,4-diamine (LXXII), N-(4,6-Bis-propylamino-[1,3,5]triazin-2-yl)-N-ethyl-O-isopropyl-hydroxylamine (LXXVI), N-(4,6-Bis-propylamino-[1,3,5]triazin-2-yl)-O-isobutyl-N-methyl-hydroxylamine (LXXXII), 6-(Methyl(thiophen-2-ylmethoxy)amino)-N2,N4-dipropyl-1,3,5-triazine-2,4-diamine (LXXXIV), N-(4,6-Bis-propylamino-[1,3,5]triazin-2-yl)-O-cyclopropylmethyl-N-methyl-hydroxylamine (XCI), N-(4,6-Bis-propylamino-[1,3,5]triazin-2-yl)-O-ethyl-N-methyl-hydroxylamine (XCVI), N-(4,6-Bis-propylamino-[1,3,5]triazin-2-yl)-O-(2,2-difluoro-ethyl)-hydroxylamine (C), 4-N-(2-Dimethylaminoethyl)amino-6-N-(n-propyl)amino-[1,3,5]triazin-2-yl)-N,O-dimethyl-hydroxylamine (CIII), 4-N-(3-(1-N-Methylimidazol-2-yl)-propyl)-amino-6-N-(n-propyl)amino-[1,3,5]triazin-2-yl)-N,O-dimethyl-hydroxylamine (CV), 4-N-(1-N-Methylimidazol-2-yl)-methylamino-6-N-(n-propyl)amino-[1,3,5]triazin-2-yl)-O,N-dimethyl-hydroxylamine (CVII), 4,6-Bis-(N-(2-dimethylaminoethyl)amino)-[1,3,5]triazin-2-yl)-N,O-dimethyl-hydroxylamine (CIX), 4,6-Bis-(N-(pyridin-4-ylmethyl)amino)-[1,3,5]triazin-2-yl)-N,O-dimethyl-hydroxylamine (CXI), 4,6-Bis-[N-(3-methoxy-n-propyl)

amino]-[1,3,5]triazin-2-yl)-N,O-dimethyl-hydroxylamine (CXIII), 4,6-Bis-[N-(tetrahydropyran-4-ylmethyl)amino]-[1,3,5]triazin-2-yl)-N,O-dimethyl-hydroxylamine (CXV), N-(5,8,11-Trioxa-2,14,16,18,19-pentaazabicyclo[13.3.1]-nonadeca-1(18),15(19),16(17)-trien-17-yl)-N,O-dimethyl-hydroxylamine (CXVII), N-(4,6-Bis-propylamino-[1,3,5]triazin-2-yl)-N',N'-dimethylhydrazine (XLVI), N-(4,6-Bis-propylamino-[1,3,5]triazin-2-yl)-N-methyl-N'-methylhydrazine (XLIX), a salt thereof and mixtures thereof. In another aspect, the salt is hydrogen sulfate or hydrochloride.

In one aspect, the at least one compound is 2,6-bis-(N-n-propylamino)-[1,3]pyrimidin-4-yl)-N,O-dimethyl-hydroxylamine N-(4-(Methoxy(methyl)amino)-6-(propylamino)-1,3,5-triazin-2-yl)propionamide or a salt thereof. In another aspect, the salt is hydrogen sulfate or hydrochloride.

In one aspect, the at least one compound is N-(4-(Methoxy(methyl)amino)-6-(propylamino)-1,3,5-triazin-2-yl)propionamide or a salt thereof. In another aspect, the salt is hydrogen sulfate or hydrochloride.

In one aspect, the at least one compound is selected from the group consisting of: 2-(n-Propyl)amino-4-(i-propylamino)-7-methyl-pyrrolidino[2,3-d]pyrimidine (CXXVI), 2-(n-Propyl)amino-4-dimethylamino-7-methyl-pyrrolidino[2,3-d]pyrimidine (CXXVIII), 2-(n-Propyl)amino-4-methylamino-7-methyl-pyrrolidino[2,3-d]pyrimidine (CXXXI), 2-(n-Propyl)amino-4-(i-propyl)amino-7-1-propyl-pyrrolidino[2,3-d]pyrimidine (CXXXVI), 2,4-Bis-(n-propyl)amino-7H-pyrrolidino[2,3-d]pyrimidine (CXLIX), 2-(n-Propyl)amino-4-(4-hydroxypiperidin-1-yl)-7-methyl-pyrrolidino[2,3-d]pyrimidine (CLII), 8-(7-Methyl-2-(propylamino)-pyrrolidino[2,3-d]pyrimidin-4-yl)-8-azabicyclo[3.2.1]octan-3-ol (CLV), a salt thereof and mixtures thereof. In another aspect, the salt is hydrogen sulfate or hydrochloride.

In one aspect, the at least one compound is selected from the group consisting of: N-(2-Propylamino-7H-pyrrolo[2,3d]pyrimidin-4-yl)-O,N-dimethyl-hydroxylamine (CXLI), N-(2-(Propen-2-yl)amino-7-methyl-pyrrolo[2,3d]pyrimidin-4-yl)-N,O-dimethyl-hydroxylamine (CLVIII), N-(2-(Propen-2-yl)amino-7-methyl-pyrrolo[2,3d]pyrimidin-4-yl)-O-methyl-hydroxylamine (CLX), N-(2-n-Propylamino-7-methyl-pyrrolo[2,3d]pyrimidin-4-yl)-O,N-dimethyl-hydroxylamine (CLXII), N-(2-n-Propylamino-7-methyl-pyrrolo[2,3d]pyrimidin-4-yl)-O-methyl-hydroxylamine (CLXIV), N-(2-n-Propylamino-7-methyl-pyrrolo[2,3d]pyrimidin-4-yl)-hydrazine (CLXVI), N-Methyl-N-(2-n-propylamino-7-methyl-pyrrolo[2,3d]pyrimidin-4-yl)-hydrazine (CLXVIII), N,N-dimethyl-N'-(2-n-propylamino-7-methyl-pyrrolo[2,3d]pyrimidin-4-yl)-hydrazine (CLXX), a salt thereof and mixtures thereof. In another aspect, the salt is hydrogen sulfate or hydrochloride.

In one aspect of a parenteral formulation, the respiratory stimulant is doxapram or a pharmaceutically acceptable salt thereof such as the hydrochloride salt. The doxapram can be formulated as a parenteral product in an amount equivalent to 1 mg base/mL to about 50 mg/mL such as 10 mg/mL, 20 mg/mL or 30 mg/mL.

In one aspect, the composition further comprises at least one pharmaceutically acceptable carrier.

In one aspect of a parenteral formulation, the antagonist is nalmefene or a pharmaceutically acceptable salt thereof. In one aspect the antagonist is nalmefene hydrochloride. In one aspect, the nalmefene or salt thereof can be in hydrate form such as the monohydrate or dehydrate form. The nalmefene can be formulated as a parenteral product in an amount equivalent to 0.1 mg base/mL or 1 mg mg/mL. In other embodiments, the amount can be an amount equivalent to about 0.01 mg base/mL to about 10 mg base/mL.

In one aspect of a nasal formulation, the antagonist is naloxone in an amount equivalent to about 4 mg to about 10 mg of naloxone hydrochloride. In some aspects, said therapeutically effective amount is equivalent to an amount chosen from about 2 mg naloxone hydrochloride, about 4 mg of naloxone hydrochloride, and about 8 mg naloxone hydrochloride.

In some aspects of a nasal formulation, the naloxone amount is equivalent to about 2 mg of naloxone hydrochloride. In some aspects of a nasal formulation, the naloxone amount is equivalent to about 4 mg of naloxone hydrochloride. In some aspects of a nasal formulation, the naloxone amount is equivalent to about 8 mg of naloxone hydrochloride. In some aspects of a nasal formulation, the naloxone amount is equivalent to about 3.4 mg of naloxone hydrochloride.

In some aspects of a nasal formulation, the naloxone amount is about 2.2 mg to about 13.2 mg of naloxone hydrochloride dihydrate. In some aspects of a nasal formulation, the naloxone amount is about 4.4 mg to about 11 mg of naloxone hydrochloride dihydrate. In some aspects, the naloxone amount is an amount chosen from about 2.2 mg naloxone hydrochloride dihydrate, about 4.4 mg of naloxone hydrochloride dihydrate, and about 8.8 mg naloxone hydrochloride dihydrate. In some aspects of a nasal formulation, the naloxone amount is about 2.2 mg of naloxone hydrochloride dihydrate. In some aspects of a nasal formulation, the naloxone amount is about 4.4 mg of naloxone hydrochloride dihydrate. In some aspects of a nasal formulation, the naloxone amount is about 8.8 mg of naloxone hydrochloride dihydrate.

In some aspects of a nasal formulation, the pharmaceutical composition comprises: between about 0.2 mg and about 1.2 mg of an isotonicity agent; between about 0.005 mg and about 0.015 mg of a preservative; between about 0.1 mg and about 0.5 mg of a stabilizing agent; an amount of an acid sufficient to achieve a pH or 3.5-5.5; and an amount of water.

In some aspects of a nasal formulation, the isotonicity agent is NaCl; the preservative is benzalkonium chloride; the stabilizing agent is disodium edetate; and the acid is hydrochloric acid.

In some aspects of a nasal formulation, said pharmaceutical composition comprises: about 0.74 mg NaCl; about 0.01 mg benzalkonium chloride; about 0.2 mg disodium edetate; an amount of hydrochloric acid sufficient to achieve a pH or 3.5-5.5; and an amount of water.

The drug of abuse that is the subject of the treated overdose can be an opioid, for example, morphine; codeine; thebaine; oripavine; diacetylmorphine; 2,4-dinitrophenylmorphine; methylenedioxydimethylamphetamine; chlomaltrexamine; dihydromorphine; hydromorphinol; nicomorphine; dipropanoylmorphine; desomorphine; acetylproprionylmorphine; methyldesorphine; N-phenethyl-normorphine; 14-hydroxydihydrocodeine (RAM-318); 7,8-dihydro-14-hydroxy-N-phenethylnormorphine (RAM-378); dibenzoylmorphine; diacetyldihydromorphine; dibenzoylmorphine; 6-monoacetylcodeine (6-MAC); acetyldihydrocodeine; dihydrocodeine; nalbuphine; nicocodeine; nicodicodeine; oxymorphazone; 1-iodomorphine; morphine-6-glycuronide (M6G); 6-monoacetylmorphine (6-MAM); norcodeine; normorphine; genomorphine; dextrallorphan (DXA); cyclorphan; dihydroheterocodeine; pholcodine; myrophine; 14-cinnamoyloxycodeinone; 14-ethoxymetopon; 14-methoxymetopon; 14-phenylpropoxymetopon (PPOM); 7-spiroindanyloxymorphone; acetylmorphone; codeinone; conorphone; codoxime; thebacon; metopon; N-phenethyl-14-ethoxymetopon; morphinone; benzylmorphine; codeine methylbromide; ethylmorphine; heterocodeine; hydromorphone; hydrocodone; oxycodone; oxymorphone; pentamorphone; semorphone; chloromorphide; ethylmorphine; buprenorphine; fentanyl; alphamethylfentanyl; alfentanil; sufentanil; remifentanil; carfentanyl; ohmefentanyl; pethidine; ketobemidone; desmethylprodine (MPPP); allylprodine; prodine; 1-methyl-4-phenyl-4-propionoxypiperidine (PEPAP); propoxyphene; dextropropoxyphene; dextromoramide; bezitramide; piritramide; levorphanol; methadone; dipipanone; levomethadyl acetate (LAAM); difenoxin; diphenoxylate; loperamide; dezocine; pentazocine; phenazocine; dihydroetorphine; etorphine; butorphanol; nalbuphine; levomethorphan; levophenacylmorphan; norlevorphanol; oxilorphan; phenomorphan; furethylnorlevorphanol; xorphanol; butorphanol; cyprodime; drotebanol; 7-PET; acetorphine; BU-48; cyprenorphine; norbuprenorphine; lefetamine; meptazinol; mitragynine; tilidine; tramadol; tapentadol; dextropropoxyphene; endorphins; enkephalins; dynorphins; and endomorphins. In some embodiments, the opioid is oxymorphone. In further embodiments, the opioid is oxycodone. The above list of opioids also includes pharmaceutically acceptable salts thereof.

The drug of abuse that is the subject of the treated overdose can be a benzodiazepine drug selected from the group consisting of: alprazolam, brotizolam, chlordiazepoxide, clobazam, clonazepam, clorazepam, demoxazepam, diazepam, flumazenil, flurazepam, balazepam, midazolam, nordazepam, medazepam, nitrazepam, oxazepam, lorazepam, prazepam, quazepam, triazolam, temazepam, loprazolam, any pharmaceutically-acceptable salts thereof.

The drug of abuse that is the subject of the treated overdose can be a barbiturate drug selected from the group consisting of amobarbital, amobarbital sodium, aprobarbital, butabarbital sodium, hexobarbital sodium, mephobarbital, metharbital, methohexital sodium, pentobarbital, pentobarbital sodium, phenobarbital, phenobarbital sodium, secobarbital, secobarbital sodium, talbutal, thiamylal sodium, and thiopental sodium any other pharmaceutically-acceptable salts thereof than those listed above.

The drug of abuse that is the subject of the treated overdose can be an insomnia drug such as a non-benzodiazepine hypnotic, a direct GABA agonist, a positive allosteric modulator of GABA receptors, a histamine receptor antagonist, or a histamine receptor inverse agonist. The insomnia drug can be, for example, zolpidem, zopiclone, eszopiclone, zaleplon, gaboxadol, indiplon, and abecarnil as well as pharmaceutically acceptable salts thereof.

What is claimed is:

1. A method of treating opioid overdose comprising administering to a patient in need thereof an opioid receptor antagonist selected from the group consisting of naltrexone, naloxone, nalmefene, and a pharmaceutically-acceptable salt thereof and a respiratory stimulant selected from a compound of the following formula or a salt thereof:

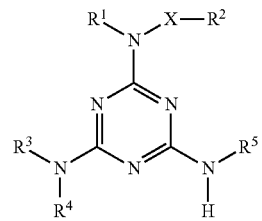

wherein:
$R^1$ and $R^2$ are independently alkyl, substituted alkyl, cycloalkyl, substituted cycloalkyl, alkenyl, substituted alkenyl, phenyl, substituted phenyl, phenylalkyl, substituted phenylalkyl, aryl, substituted aryl, arylalkyl, substituted arylalkyl, heteroarylalkyl, substituted heteroarylalkyl, heteroaryl or substituted heteroaryl; or $R^1$ and $R^2$ combine as to form a biradical selected from the group consisting of 3-hydroxy-pentane-1,5-diyl, 6-hydroxy-cycloheptane-1,4-diyl, propane-1,3-diyl, butane-1,4-diyl and pentane-1,5-diyl;
X is a bond, O or $NR^4$,
$R^3$ is alkyl, substituted alkyl, cycloalkyl, substituted cycloalkyl, alkenyl, or substituted alkenyl;
$R^4$ is H, alkyl, or substituted alkyl;
and
$R^5$ is alkyl, substituted alkyl, cycloalkyl, substituted cycloalkyl, alkenyl, substituted alkenyl, or acyl.

2. The method of claim 1, where the opioid overdose is accompanied by respiratory depression.

3. The method of claim 1, wherein the antagonist and the stimulant are administered simultaneously or sequentially.

4. The method of claim 3, wherein the antagonist and the stimulant are administered by the same route of administration.

5. The method of claim 3, wherein the antagonist and the stimulant are administered by different routes of administration.

6. The method of claim 3, wherein the antagonist and the stimulant are administered in the same pharmaceutical composition.

7. The method of claim 3, wherein the antagonist and the stimulant are administered in different pharmaceutical compositions.

8. The method of claim 1, wherein the respiratory stimulant is selected from the group consisting of N-(4,6-bis-n-propylamino-[1,3,5]triazin-2-yl)-N,O-dimethyl-hydroxylamine, and a pharmaceutically-acceptable salt thereof.

* * * * *